C. E. P. JULIEN.
VEHICLE WHEEL TIRE.
APPLICATION FILED MAR. 27, 1918.

1,323,868.

Patented Dec. 2, 1919.
2 SHEETS—SHEET 1.

Fig. 3ª

INVENTOR
Cyprien Edouard Paul Julien
BY
ATTORNEYS

C. E. P. JULIEN.
VEHICLE WHEEL TIRE.
APPLICATION FILED MAR. 27, 1918.

1,323,868.

Patented Dec. 2, 1919.
2 SHEETS—SHEET 2.

INVENTOR
Cyprien Edouard Paul Julien
BY
ATTORNEYS

UNITED STATES PATENT OFFICE.

CYPRIEN EDOUARD PAUL JULIEN, OF PARIS, FRANCE.

VEHICLE-WHEEL TIRE.

1,323,868.   Specification of Letters Patent.   Patented Dec. 2, 1919.

Application filed March 27, 1918. Serial No. 225,011.

*To all whom it may concern:*

Be it known that I, CYPRIEN EDOUARD PAUL JULIEN, a citizen of the French Republic, and residing in Paris, France, 1 Avenue de l'Observatoire, engineer, have invented certain new and useful Improvements in and Relating to Vehicle-Wheel Tires, of which the following is a complete specification.

This invention has for its object to provide an improved wheel tire adapted to run on both hard and soft ground. The improved tire comprises a plain tread having permanent ground-gripping projections and adapted to be fitted with removable additional ground-gripping studs giving increased adhesion in the case of tractors and agricultural machines.

The tires of driving wheels of tractors and various agricultural machines (both included in the term "vehicle") should satisfy the following general conditions as regards their running over the ground:—

1. They should have practically plain treads to enable them to run on hard roads like ordinary animal-drawn vehicles.

2. Nevertheless, on arrival on the field, they should be capable of giving a normal degree of adhesion which cannot be given by their plain treads alone.

3. They should comprise devices for giving an increased degree of adhesion whereby they are enabled to utilize the available power effectively to its utmost for overcoming the resistances to its progress over the ground, whatver such resistances may be.

The present invention has for its object to satisfy all those conditions by simple means.

This object is attained by the employment of an annular tire of suitable dimensions, having a plain treaded portion provided on its inner periphery with suitably shaped permanent lateral projections set at right angles or at an inclination to the plane of the wheel. These permanent projections are adapted to serve as supports for removable additional ground-gripping studs which bear against the side of the plain treaded portion and project beyond the latter either in the plane of the wheel spokes or in planes at an angle thereto.

A constructional form of the invention is illustrated by way of example in the accompanying drawings in which:—

Figures 1, 2, 3 and 3ª are respectively a plan, a cross section, a side view, and a perspective view of a portion of the improved vehicle tire.

Each segment or portion of the plain treaded tire portion $a$ is formed on its inner surface with V-shaped permanent projections $b$ which propect beyond both sides of the said plain-treaded portion $a$. Upon each permanent projection $b$ there is adapted to be mounted without the use of screws or bolts, an additional ground-gripping stud $c$ either by clipping the stud $c$ upon the projection $b$ if the stud is made of elastic metal, or by slipping the stud $c$ from the side on to the projection $b$.

The operation of the improved combination is as follows:—

So long as the tire $a$ is not fitted with the studs $c$, the tire $a$ can run on its plain tread freely on hard roads.

When the vehicle has arrived at the field and the tire $a$ begins to sink into the ground, the side projections $b$ will enter the ground in their turn and take a grip of it which will be the more effective in overcoming the resistance to the rolling wheel, the deeper the latter sinks into the ground.

The number, dimension and position of the permanent projections may be made in the manufacture, such that in most cases these permanent projections will enable the wheels to have sufficient adhesion for work on ordinary soft ground.

If however, the ground or the work to be done is such that the ground-gripping power of these permanent projections is not sufficient, then the wheel is fitted with the removable studs $c$ which, as they project deeply into the ground beyond the tread of the tire, will enable the wheel to grip the ground with the maximum degree of adhesion.

Figure 3:
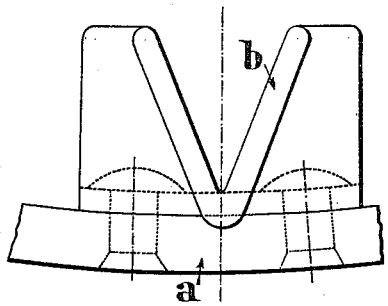
Figure 3:
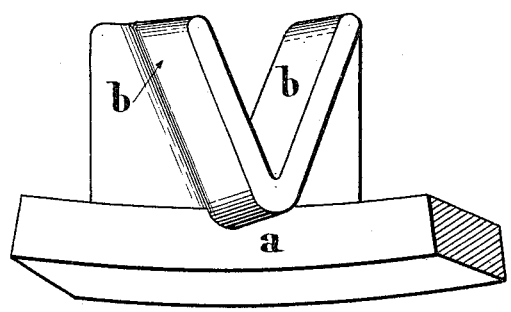
Figure 1:
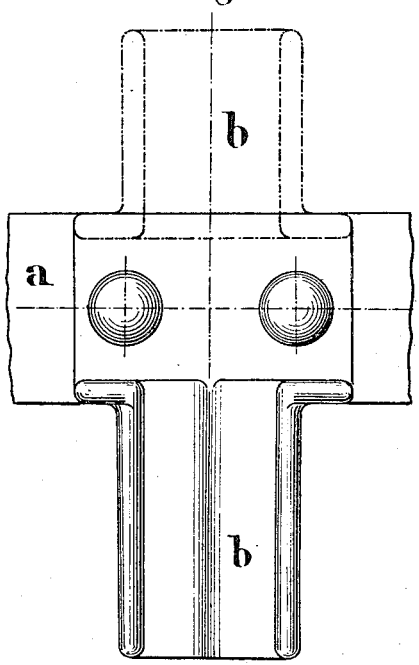
Figure 6:
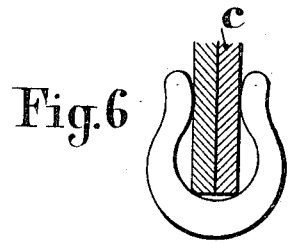
Fig. 6 is a detail.
Figure 4:
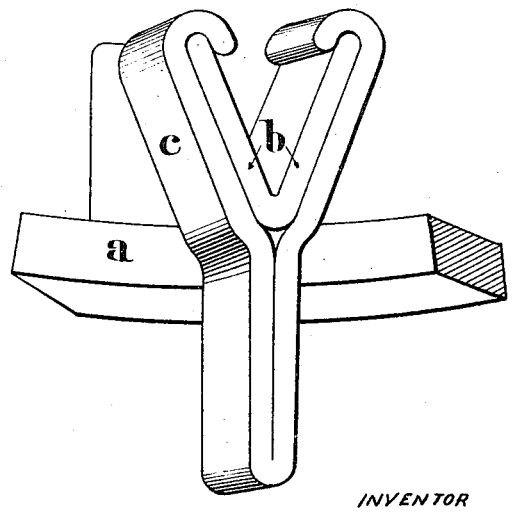
Fig. 4 is a perspective view of an additional ground-gripping stud.
Figure 2:
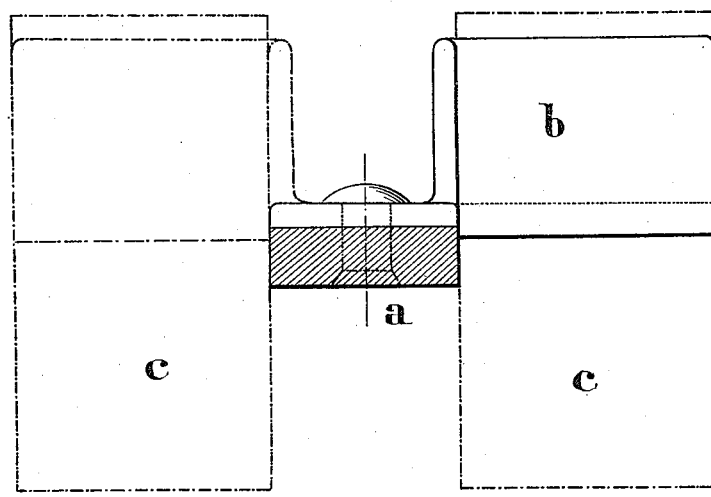
Figure 5:
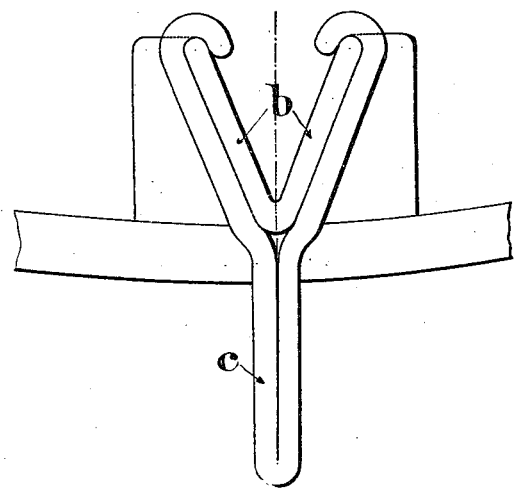
Fig. 5 is a side view thereof.

The permanent projections $b$ and the removable studs $c$ may be provided and fitted on one and the same side only of the wheel, or on opposite sides of the wheel. In the case of a twin-tired wheel or twin-treaded tire, they may be provided and fitted between the two tires or the two treads. The removable studs may be kept in place by any suitable devices, for instance, by means of elastic metal clips of the kind shown in Fig. 6.

The permanent projections b may be made in one piece with the tire, or they may be made separately therefrom in which case they may be fixed to the tire by being bolted, riveted, welded or brazed thereto.

The removable studs c may consist of a simple strip of metal suitably bent or folded into shape, and they may have the form of teeth, points or angles.

What I claim is:

In a vehicle wheel, a tire having a plain tread and provided with an integral member forming V-shaped projections having an attaching flange secured to the inner surface of the tire, said projections extending laterally beyond the tire, and Y-shaped studs removably secured to the projections and having rebent portions engaging the same for said purpose, said studs projecting beyond the tread of the tire.

In testimony whereof I have hereunto set my hand at the city of Paris, (France), this 6th day of March, 1918.

CYPRIEN EDOUARD PAUL JULIEN. [L. S.]

In the presence of two witnesses:
CHAS. P. PRESSLY,
EMILE BERTRAND.